United States Patent [19]

McMillen

[11] Patent Number: 4,531,586

[45] Date of Patent: Jul. 30, 1985

[54] METHOD OF SOLVENT STIMULATION OF HEAVY OIL RESERVOIRS

[75] Inventor: James M. McMillen, Arlington, Tex.

[73] Assignee: Mobil Oil Corporation, New York, N.Y.

[21] Appl. No.: 564,044

[22] Filed: Dec. 21, 1983

Related U.S. Application Data

[63] Continuation-in-part of Ser. No. 307,544, Oct. 1, 1981, abandoned.

[51] Int. Cl.³ .................... E21B 43/22; E21B 43/40
[52] U.S. Cl. ............................... 166/305 R; 166/267
[58] Field of Search ............ 166/263, 267, 303, 305 R

[56] References Cited

U.S. PATENT DOCUMENTS

| | | | |
|---|---|---|---|
| 2,258,614 | 10/1941 | Kendrick | 166/263 |
| 2,259,428 | 10/1941 | Shelley | 166/305 R X |
| 2,369,831 | 2/1945 | Jones et al. | 166/305 R |
| 2,927,639 | 3/1960 | Schuessler et al. | 166/305 R |
| 2,998,066 | 8/1961 | Nixon, Sr. | 166/305 R |
| 3,295,601 | 1/1967 | Santourian | 166/263 |
| 3,554,289 | 1/1971 | Webb | 166/305 R |
| 3,881,550 | 5/1975 | Barry | 166/303 X |
| 3,978,926 | 9/1976 | Allen | 166/305 R X |
| 4,280,559 | 7/1981 | Best | 166/303 |
| 4,293,035 | 10/1981 | Fitch | 166/271 X |
| 4,450,913 | 5/1984 | Allen et al. | 166/267 X |

FOREIGN PATENT DOCUMENTS 600218 6/1960 Canada ........................ 166/263

*Primary Examiner*—George A. Suchfield
*Attorney, Agent, or Firm*—Alexander J. McKillop; Michael G. Gilman; Stanislaus Aksman

[57] ABSTRACT

This invention provides a method for cyclic solvent stimulation of production of heavy oil from an underground reservoir penetrated by a well which comprises:
  (a) injecting into the reservoir a liquid solvent having a ratio of crude viscosity to solvent viscosity of at least about 10 and in an amount between about 5 barrels and about 25 barrels per foot of oil-bearing formation; and
  (b) thereafter producing a solvent-oil mixture.

10 Claims, No Drawings

METHOD OF SOLVENT STIMULATION OF HEAVY OIL RESERVOIRS

CROSS-REFERENCE TO RELATED APPLICATION

This application in a continuation-in-part of copending application Ser. No. 307,544, filed Oct. 1, 1981, now abandoned, the contents of which are hereby expressly incorporated herein by reference.

BACKGROUND OF THE INVENTION

1. Field of the Invention

This invention is concerned with the stimulation of production of heavy oil.

2. Description of the Prior Art

Solvents have been injected into heavy oil wells in years past in order to improve production from those wells. Generally, the solvents used were light hydrocarbons, such as a rich gas, or light liquid hydrocarbons plus additives. These additives were for such purposes as dissolving deposited solid hydrocarbons or for breaking oil-water emulsions. Such mixtures were much more expensive than equal volumes of the crude they were designed to help produce. Reported results have indicated that well clean-up and emulsion reduction have been the primary mechanisms responsible for any increased production resulting from solvent injection. Production improvement as a result of the viscosity reduction due to solvent dilution has been discounted as a practical procedure.

It is the unexpected discovery of this invention that the production of heavy oil can be greatly increased by solvent dilution of heavy crude alone, the dilution resulting in a reduced viscosity of the solvent/crude mixture. The production increase is a result of proper design criteria of the solvent stimulation procedure, involving the volume of solvent used and the soak period prior to resumption of production. The continuity of production, once begun, is also important to the procedure. It has also been found that the same well can be solvent stimulated successfully many times, depending on the choice of proper intervals between solvent injections. In addition, it has been determined that relatively inexpensive hydrocarbons without additives, such as light crude oils, can be used as the solvent.

SUMMARY OF THE INVENTION

This invention provides a method for cyclic solvent stimulation of production of heavy oil from an underground reservoir penetrated by a well which comprises:
(a) injecting into the reservoir a liquid solvent having a ratio of crude viscosity to solvent viscosity of at least about 10 and in an amount between about 5 barrels and about 25 barrels per foot of oil-bearing formation; and
(b) thereafter producing a solvent-oil mixture.

DESCRIPTION OF SPECIFIC EMBODIMENTS

As used in specification and claims, "heavy" crude oil is a viscous crude oil that has poor flow characteristics in the reservoir. In general, it is a crude oil that has a API gravity of about 20 degrees or lower.

The solvent used should be substantially, but not necessarily completely, miscible with the crude oil. It must have viscosity lower than that of the crude. In general, the ratio of crude viscosity to solvent viscosity at reservoir conditions should be at least about 10, preferably 100 or more. Suitable solvents are light crude oil, syncrude, diesel fuel, condensate, cutter stock, or other light hydrocarbons. It is within the contemplation of this invention that about a third of the injected solvent can be solvent-rich production, i.e., the initial production from a solvent stimulated production that is rich in solvent content. The injected solvent having the desired viscosity moves away from the wellbore into the formation forming solvent fingers that are larger near the wellbore and decrease in size as they advance into the formation. The solvent fingers near the wellbore provide a high mobility path for subsequent produced oil backflowing into the well. To provide adequate solvent fingering near the wellbore and significantly reduce the viscosity of the in-place oil by diffusion and mixing, the amount of solvent that is injected is between about 5 barrels and about 25 barrels per foot of oil-bearing formation, preferably between about 10 and about 20.

After solvent injection has been completed, there should be little or no soak time, i.e., the time between the end of solvent injection and the start of production. Generally, the soak time will be between about an hour or less and about 48 hours, preferably less than 24 hours. In accordance with this invention, there is little advantage, if any, in an appreciable soak time to effect diffusive mixing of solvent and heavy oil. It appears that prolonged soak time of several days or more isolates solvent by gravity driven mixing and destroys the high mobility paths near the well, so that there is little increase in production over that obtained in unstimulated production.

Production, when commenced after solvent injection is completed, should be maintained continuously. Any shut-down should be kept under 48 hours, preferably under 24 hours. Production should be continued until the fraction of solvent in the produced oil has dropped to about 12% or less, regardless of production rate. At this point, additional solvent or solvent and solvent-rich production can be injected into the reservoir followed by resumed production.

These cycles of solvent injection and production can be continued until the reservoir is exhausted. Essentially all (about 97%) of the solvent injected into a formation in a multi-cycle solvent stimulation is returned with produced oil. Thus, it can be separated from the produced oil on site, if desirable or practical, by some separation method, e.g., in a topping plant, and used in subsequent injections. Alternatively, the mixture of solvent and heavy oil can be used directly as a refinery charge stock and it has the advantage of being easily pipelined.

EXAMPLE

The well used was a Cox Penn Sand Unit well located in Carter County, Okla. It is completed in the 4th Deese sand which contains oil with a gravity of 15° API. The thickness of the oil bearing formation is about 43 feet. The unstimulated rate of production from this well was 8.5 barrels of oil per day (BOPD). The solvent used was Graham-Deese light crude oil (about 34° API), unless otherwise noted.

The well was subjected to five injection-production cycles. The first three cycles each consisted of solvent injection of about 400 barrels. Cycle 1 used as solvent fresh Graham-Deese crude for the full volume. The first 135 barrels of solvent-rich production (greater than 28° API, containing about 70% solvent) was saved and used as the middle portion of the following injection, the remainder being the fresh light crude. This procedure was followed through the subsequent cycles. Each cycle involved injection one day with production starting the next morning for convenience in monitoring the returning fluids.

For the fourth cycle, the injected volume was increased to about 1200 barrels to determine whether average production rate or the incremental barrel/injected barrel ratio was changed using a larger injected volume. Both were dramatically lower, showing that the injected volume can be too large and that multiple small injections produce more incremental oil.

The fifth cycle, in order to make a direct comparison with the first three, was again an about 400 barrel injection. The initial production rate was too high and average rate and incremental volumes suffered in comparison, but incremental oil was produced and increased average rate achieved more nearly like the first three 400 barrel cycles than the 1200 barrel cycle.

These runs and the results are set forth in the following Table:

TABLE

| Cycle | Injected Volume (Bbl Solvent) | Total Production (Bbl Oil) | Incremental Production (Bbl Oil) | Average Rate* (BOPD) | Test Period (Days) | Fraction of Solvent Recovered % |
|---|---|---|---|---|---|---|
| 1 | 385 | 921 | 230 | 14.9 | 36 | 89 |
| 2 | 401 | 935 | 227 | 14.8 | 36 | 97 |
| 3 | 394 | 1022 | 280 | 15.0 | 42 | 97 |
| 4 | 1181 | 2302 | 350 | 12.3 | 91 | 97 |
| 5 | 401 | 892 | 185 | 13.6 | 36 | 101 |

*pre-stimulation rate was 8.5 BOPD.

From the data in the Table, it will be noted that the four cycles of about 400 injected barrels of solvent produced an incremental 185 to 280 barrels of oil (0.48 to 0.71 barrels/injected barrel) at an average rate of 5.3 to 6.8 BOPD greater than the unstimulated rate of 8.5 BOPD. This amounts to a 62% to 80% increase in production. The 1181 barrel injection produced 350 barrels of incremental oil (0.3 barrels/barrel) at a rate of 3.8 BOPD greater than the unstimulated rate, a 45% increase in production.

Additional experiments in seven other wells in five other heavy oil reservoirs have shown results similar to or better than those cited above, in terms of either increased average production rate or incremental oil barrels/barrel of solvent injected.

Although the present invention has been described with preferred embodiments, it is to be understood that modifications and variations may be resorted to, without departing from the spirit and scope of this invention, as those skilled in the art will readily understand. Such modifications and variations are considered to be within the purview and scope of the appended claims.

What is claimed is:

1. A method for solvent stimulation of heavy crude oil from an underground reservoir penetrated by a well, which comprises:
   (a) injecting into the reservoir a liquid solvent having such a viscosity that the ratio of the crude oil viscosity to solvent viscosity is at least about 10, to form solvent fingers near the well, and in an amount between about 5 barrels and about 25 barrels per foot of oil-bearing formation to provide adequate solvent fingering near the wellbore and significantly reduce the viscosity of the heavy crude oil; and
   (b) thereafter producing a solvent-oil mixture.

2. The method of claim 1, wherein said ratio is at least about 100.

3. The method of claim 2, wherein said amount is between about 10 barrels and about 20 barrels per foot of oil-bearing formation.

4. The method of claim 3, wherein the producing in step (b) is carried out until the amount of solvent in the produced solvent-oil mixture drops below about 12 percent.

5. The method of claim 4, wherein steps (a) and (b) are repeated.

6. The method of claim 5, wherein the solvent is a light crude oil.

7. The method of claim 1, wherein at least a portion of the injected solvent is solvent-rich production from a previous cycle.

8. The method of claim 7 further including the step of allowing the reservoir to undergo a brief soak time ranging from about one hour to about 48 hours after solvent injection according to step (a).

9. The method of claim 8, wherein the soak time is between about one hour and about 24 hours.

10. The method of claim 5 wherein the solvent is light crude oil, syncrude, diesel fuel, condensate, cutter stock or other light hydrocarbons.

* * * * *